Sept. 14, 1965   E. HENRY-BIABAUD   3,205,964
COOLING-AIR CIRCUITS FOR THE ENGINES
OF AUTOMOBILE VEHICLES
Filed Nov. 18, 1963

United States Patent Office 3,205,964
Patented Sept. 14, 1965

3,205,964
COOLING-AIR CIRCUITS FOR THE ENGINES OF AUTOMOBILE VEHICLES
Edmond Henry-Biabaud, Paris, France, assignor to Societe Anonyme Andre Citroen, Paris, France, a French corporation
Filed Nov. 18, 1963, Ser. No. 324,585
Claims priority, application France, May 7, 1960, 826,534, Patent 1,264,056
8 Claims. (Cl. 180—54)

This is a continuation-in-part of my co-pending application Ser. No. 107,740 of May 4, 1961, now abandoned.

The present invention relates to the cooling of engines of automotive vehicles.

Automobile engines are cooled by the circulation of air acting either directly on fins arranged around the cylinders, or indirectly through a radiator in which the liquid cools the engine by flowing around the cylinder walls.

In this latter case in particular, a fan is provided in order to create a sufficient flow of air at low vehicle speeds, whereas at high forward speeds of the vehicle the dynamic pressure ensures the necessary circulation of air.

It has, however, been observed that the permeability of radiators employed is generally insufficient for all the air passing through the orifices located in the front portion of the vehicle to flow correctly.

In any case, the flow of air through the radiator or over the system of fins in the case of direct-cooled cylinders is conditioned by the permeability of the device comprising the radiator or the fins, and the air-circulation circuit on the intake and outgoing sides.

Now, the circuit may absorb a large quantity of energy; for example, if on the intake side of the radiator the air inlet surfaces are excessively large, considerable turbulence is induced at the air intakes or even in the interior of the circuit, resulting in a considerable loss of energy corresponding to an undesirable expenditure of fuel and to a reduction in the maximum speed of the vehicle.

It is an object of the invention to arrange for the intake of cooling air and the position of the radiator, in order to obtain a continuous flow of air in the interior of the circuit.

In a more particular manner, an advantageous form of embodiment consists especially in providing an air intake, the transverse section of which is located in a plane having an inclination with respect to the longitudinal axis of the vehicle, this inclination being preferably less than 45°, and the air intake being preferably located on the lower face of the body casing enclosing the vehicle, and being connected by an air passageway of appropriate shape to the radiator.

Figure 1:
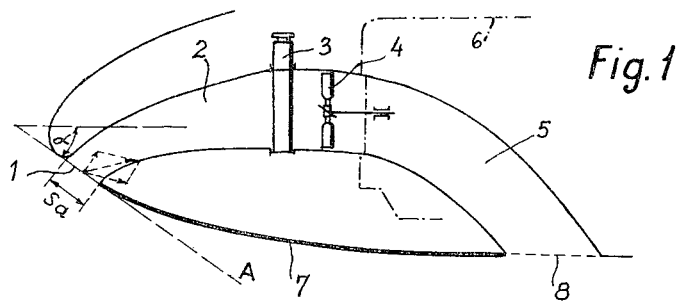

The invention will now be described with reference to the accompanying drawing, in which:

The FIGURE 1 is a diagrammatic vertical section of a vehicle in accordance with the invention.

Figure 2:
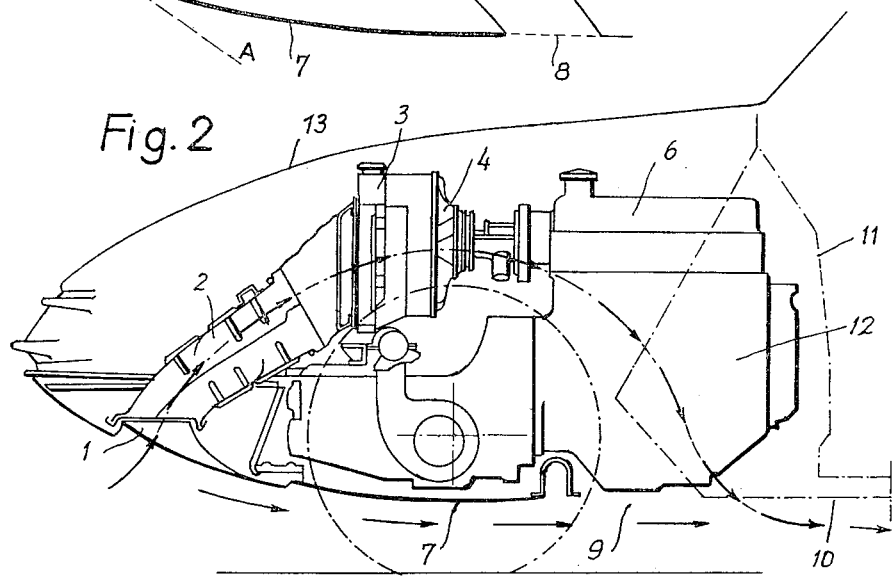

The FIGURE 2 is a more detailed vertical section of a form of embodiment.

Figure 3:
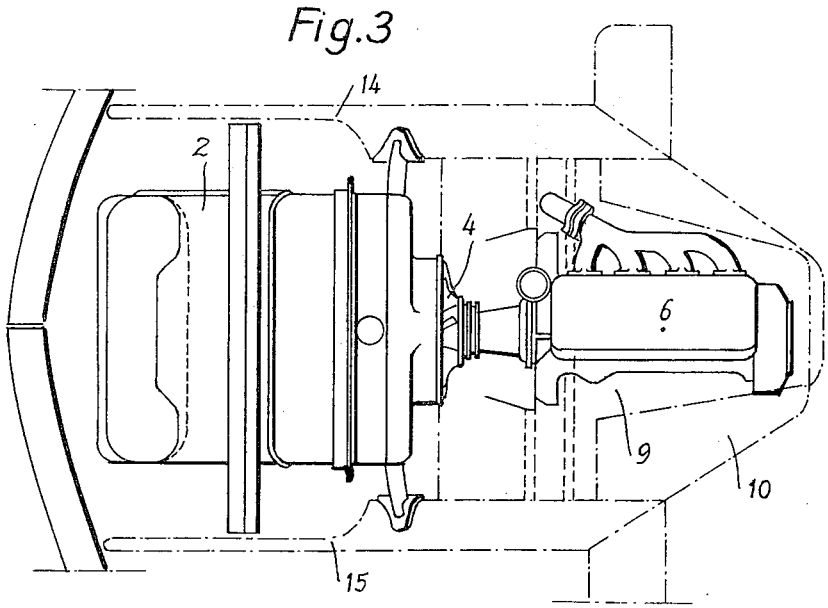

The FIGURE 3 is a plan view corresponding to the FIGURE 2.

The vehicle is of the type with its engine at the front and provided with a water-circulation radiator through which the cooling air passes, and a fan mounted behind the radiator. An air circuit is provided comprising an air intake orifice 1 located in a plane inclined with respect to the longitudinal axis of the vehicle, an air passageway 2 of curved divergent or convergent-divergent shape leading to the radiator 3 and to the fan 4, and an air-evacuation passageway, amply dimensioned for the flow of the maximum quantity of air required.

The advantage of an arrangement of this kind will be clearly apparent from the following considerations:

Supposing that the $Vo$ is the speed of the air at the intake orifice having an effective surface area $So$; if $VI$ is the speed of the air through the radiator having a total passage surface of $Sl$, then in order that the quantity of air admissible at the intake may be equal at every instant to the quantity of air passing through the radiator, the following relation should be satisfied:

$$VlSl = VoSo \text{ or } \frac{VI}{Vo} = \frac{So}{Sl}$$

this ratio being capable of definition as the permeability of the system.

It thus becomes desirable to find means for varying $So$ as an inverse function of $Vo$, which speed is closely dependent on the speed of forward movement of the vehicle, and to take into account the power of the fan which has a relative importance with reference to the dynamic intake pressure as a function of $$\frac{N}{Vo}$$

where N is the speed of rotation of the fan r.p.m.

It is clear that one solution consists in the arrangement shown, in choosing for the air passageway 2 in which the useful portion of the radiator 3 is housed, an intake orifice having its transverse section located in a plane which is inclined with respect to the axis of the vehicle. If $\alpha$ is the angle of inclination, it will readily be understood, as shown by the parallelogram of speeds of air due to the suction of the fan on the one hand and to the speed of the vehicle on the other, that the effective air intake surface varies from $Sa$ which is the surface area of the air intake in the plane A, to $Sa \sin \alpha$ for high speeds of the vehicle, while the dynamic intake pressure is largely preponderant with respect to the suction of the fan, the action of which can even be dispensed with. By choosing a suitable value of $\alpha$, preferably less than 45°, there will be obtained for the effective surface $So = Sa \sin \alpha$ a value which will dimish rapidly with the speed of the vehicle and will enable the ratio $$\varphi = \frac{VI}{Vo} = \frac{So}{Sl}$$

to be maintained within the limits admissible for the circuit.

Furthermore, as shown in the drawing, the air-intake orifice will preferably be in the form of a convergent-divergent nozzle disposed on the lower face of the body casing enclosing the engine, the casing being aerodynamically profiled so that the stream of air may penetrate into the orifice 1 or may follow the lower part of the casing without creating any substantial turbulence, the orifice 1 being followed by a divergent coupling passageway up to the raditor, the useful portion of which is housed in the interior of this passageway, while the evacuation may or may not be effected by special pipes, without however resulting in additional losses of pressure of any substantial nature.

Thus, the evacuation can be carried out by one or preferably two tubular members 5 enclosing the engine 6 and directed downwards where they are connected to the undershield 7, the air passing out through the orifice 8.

However, it has been proved that these outlet tubes could be eliminated without causing substantial losses of pressure, by adopting the arrangement shown in FIGURES 2 and 3.

These figures, in which the same parts have been indicated by the same reference numbers as in FIGURE 1, show the front compartment 12 in which is housed the engine 6 of the vehicle. This compartment is defined at its upper portion by a hood 13, at the rear by the dashboard 11, on the sides by the inner wing faces 14 and 15, and at the front by a part of the bodywork to which is connected the lower partition 7, suitably curved, in which is provided the air-inlet 1 of the air passageway, preferably formed by a convergent-divergent nozzle, this air inlet having its transverse section located in a plane inclined with reference to the axis of the vehicle at an angle less than 45°.

The undershield partition 7 terminates approximately at or forwardly of the front portion of the engine so as to leave a large opening 9 below the engine, limited at the rear by the floor 10 of the vehicle.

The undershield partition 7 and the flooring 10 are arranged so as to be approximately on the same horizontal level, so that the streams of air directed by the partition 7 pass underneath the vehicle without substantial turbulence up to the zone of the flooring 10 and without passing into the opening 9. Whereas in the usual types of vehicle, the air impinges freely against the lower face of the engine and its parts and thus creates turbulence and eddies, in the present application, on the other hand, these air streams, which continue without substantial deformation under the opening 9, cause an appreciable suction by an ejector effect, creating a suction pressure in the lower portion of the engine space 12.

This suction pressure becomes greater as the speed of the vehicle increases, and acts on the air passing out of the fan 4, so that instead of this air continuing its course up to the dashboard 11, where eddy currents would be formed, it is drawn downwards and becomes mixed with the air passing under the vehicle. Thus, by virtue of the front undershield 7, the air which passes through the rising passageway formed by the inlet 1, the tubular member 2, the radiator 3 and the fan 4, from which is passes approximately in an axial direction, is guided in a downwardly-inclined direction to the opening 9. This opening must obviously have an extra large section in order that the air can flow easily during periods of maximum flow-rate, which is a simple matter to achieve.

As in FIGURE 1, the air inlet 1 is connected to the radiator 3 by a divergent air passageway 2, the radiator being located in a transverse plane with respect to the vehicle, and being followed by the fan 4, preferably of the declutchable type.

It will be understood that by this means there is produced an air passageway for the radiator of a vehicle, the air drawn from the front under the lower inclined portion being brought up to the radiator and then directed back towards the lower portion following a path having the contour of a dome, in which the radiator is arranged at the summit, this circuit having minimum losses of pressure and being arranged in such manner that the flow of air regulates itself automatically as a function of the forward speed of the vehicle.

What is claimed is:

1. A cooling air circuit for a vehicle having an engine heat exchanger disposed in said circuit, said vehicle having a longitudinal axis, said circuit comprising a peripherally enclosed smooth wall conduit provided with a passageway having at one end thereof an air-intake orifice, said passageway leading to said heat exchanger which is located therein at an end remote from said orifice, said heat exchanger being permeable and having a total surface for the passage of air which is substantially equal to the magnitude of the passage at the air-intake orifice, means defining an evacuation passageway beyond said heat exchanger for the outflow of air from the heat exchanger and offering substantially slight resistance to the outflow of air, a fan in said circuit adjacent the heat exchanger for drawing air into said intake orifice substantially perpendicular thereto, said intake orifice lying in a plane inclined with respect to the axis of the vehicle at an angle of less than 45° to present a reduced area to the direct inflow of air when the vehicle is moving forwardly along said axis, said vehicle including a body casing having a lower contour, said air-intake orifice being located on said contour, said evacuation passageway having an outlet lying along said contour rearwardly of the air-intake orifice, said body casing being effective to smoothly divert air flow which passes the air-intake orifice along said lower contour to develop suction pressure at said outlet of the evacuation passageway and thereby induce the flow of air passing through said heat exchanger into the evacuation passageway, the first said passageway having sections of increasing areas in a direction towards said heat exchanger for cooperating with said inclined intake orifice to enable turbulent-free flow of air through said passageway for substantially all speeds of the vehicle.

2. A cooling air circuit as claimed in claim 1 wherein said evacuation passageway includes at least one enclosed smooth wall air passageway beyond the heat exchanger, by which the air is conducted to said outlet.

3. A cooling air circuit as claimed in claim 1, wherein said heat exchanger is located at a maximum elevation in said circuit.

4. A cooling air circuit as claimed in claim 1, in which the air-intake orifice is in the form of a convergent-divergent nozzle.

5. A vehicle having an engine and a cooling air circuit for said engine, the vehicle being provided with an engine heat exchanger disposed in said circuit, said vehicle having a longitudinal axis, said circuit comprising a peripherally enclosed smooth wall conduit provided with a passageway having at one end thereof an air-intake orifice, said passageway leading to said heat exchanger which is located therein at an end remote from said orifice, said heat exchanger being permeable and having a total surface for the passage of air which is substantially equal to the magnitude of the passage at the air-intake orifice, means defining an evacuation passageway beyond said heat exchanger for the outflow of air from the heat exchanger and offering substantially slight resistance to the outflow of air, a fan in said circuit adjacent the heat exchanger for drawing air into said intake orifice substantially perpendicular thereto, said intake orifice lying in a plane inclined with respect to the axis of the vehicle at an angle of less than 45° to present a reduced area to the direct inflow of air when the vehicle is moving forwardly along said axis, said vehicle comprising a body having a lower partition located beneath the engine and forwardly thereof, and a floor portion located rearwardly of the engine and therebeneath whereby the body is open beneath the engine, said floor portion and partition being at a substantially common level beneath the engine and defining a smooth lower contour for the body, said air-inlet being provided in said partition forwardly of the engine, said partition being curved from the inlet to the level of the floor portion to divert air which passes the inlet smoothly beneath the engine for passage towards said floor portion, the latter passage of air being effective to establish suction pressure in the open portion of the body beneath the engine, the latter open portion being in communication with the evacuation passageway whereby the developed suction pressure induces the flow of air in the evacuation passageway in a direction away from the heat exchanger and towards the open portion of the body, the first said passageway having sections of increasing areas in a direction towards said heat exchanger for cooperating with said inclined intake orifice to enable turbulent-free flow of air through said passageway for substantially all speeds of the vehicle.

6. A vehicle as claimed in claim 5 wherein said evacuation passageway extends from the heat exchanger past the engine to the open portion of the body.

7. A vehicle as claimed in claim 5 wherein the heat exchanger is located at a maximum elevation in the circuit.

8. A cooling air circuit for a vehicle having an engine heat exchanger disposed in said circuit, said vehicle having a longitudinal axis, said circuit comprising a peripherally enclosed smooth wall conduit provided with a passageway having at one end thereof an air-intake orifice, said passageway leading to said heat exchanger which is located therein at an end remote from said orifice, said orifice lying in a plane inclined with respect to the axis of the vehicle at an angle of less than 45°, said passageway having increasing areas from said air-intake orifice to the heat exchanger to provide turbulent-free passage of cooling air from the air-intake orifice to said heat exchanger, means defining an evacuation air passageway beyond said heat exchanger for the outflow of air from the heat exchanger offering substantially slight resistance to the outflow of air, and a fan in said circuit adjacent the heat exchanger for drawing air into said intake orifice substantially perpendicular thereto, said heat exchanger being permeable and having a total surface for the passage of air which is substantially equal to the magnitude of the passage at the air-intake orifice, said vehicle including a body casing having a lower contour, said air-intake orifice being located on said contour, said evacuation passageway having an outlet lying along said contour rearwardly of the air-intake orifice, said body casing being effective to smoothly divert air flow which passes the air-intake orifice along said lower contour to develop suction pressure at said outlet of the evacuation passageway and thereby induce the flow of air passing through said heat exchanger into the evacuation passageway.

References Cited by the Examiner

UNITED STATES PATENTS

| | | | |
|---|---|---|---|
| 1,803,156 | 4/31 | Wagner | 165—44 |
| 2,191,599 | 2/40 | Valletta | 180—54 |
| 2,358,663 | 9/44 | Scott-Iverson | 180—54 |

FOREIGN PATENTS

| | | |
|---|---|---|
| 407,530 | 3/34 | Great Britain. |
| 831,597 | 3/60 | Great Britain. |
| 688,873 | 5/30 | France. |
| 1,138,365 | 1/57 | France. |
| 1,150,725 | 8/57 | France. |
| 1,264,056 | 5/61 | France. |

BENJAMIN HERSH, *Primary Examiner.*

PHILIP ARNOLD, *Examiner.*